(12) United States Patent
Yang et al.

(10) Patent No.: US 10,346,284 B1
(45) Date of Patent: Jul. 9, 2019

(54) FEATURE USAGE PREDICTION USING SHELL APPLICATION FEATURE TELEMETRY

(71) Applicant: Microsoft Technology Licensing, LLC, Redmond, WA (US)

(72) Inventors: Chenguang Yang, Seattle, WA (US); Bernhard S. J. Kohlmeier, Seattle, WA (US); Lin Ma, Mercer Island, WA (US); Madeline Kleiner, Redmond, WA (US); Peng Qin, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/868,697

(22) Filed: Jan. 11, 2018

(51) Int. Cl.
*G06F 9/44* (2018.01)
*G06F 11/36* (2006.01)
*G06Q 30/02* (2012.01)

(52) U.S. Cl.
CPC ...... *G06F 11/3616* (2013.01); *G06F 11/3608* (2013.01); *G06Q 30/0202* (2013.01)

(58) Field of Classification Search
CPC .......................... G06F 11/3616; G06F 11/362
USPC .................................................. 717/123–129
See application file for complete search history.

(56) References Cited

U.S. PATENT DOCUMENTS

| 6,301,701 | B1 * | 10/2001 | Walker | G06F 11/3688 |
| | | | | 702/123 |
| 6,931,434 | B1 * | 8/2005 | Donoho | G06Q 10/10 |
| | | | | 709/207 |
| 7,209,644 | B2 * | 4/2007 | Kikuchi | G11B 27/034 |
| | | | | 386/241 |
| 7,769,794 | B2 * | 8/2010 | Moore | G06F 16/168 |
| | | | | 707/831 |
| 7,934,261 | B1 * | 4/2011 | Saguiguit | G06F 21/565 |
| | | | | 726/24 |
| 8,171,553 | B2 * | 5/2012 | Aziz | G06F 9/45537 |
| | | | | 726/24 |
| 8,464,205 | B2 * | 6/2013 | Chaar | G06F 8/20 |
| | | | | 717/101 |
| 8,584,239 | B2 * | 11/2013 | Aziz | G06F 21/554 |
| | | | | 726/24 |
| 8,589,882 | B2 * | 11/2013 | Shochat | G06Q 10/06 |
| | | | | 717/124 |
| 8,776,088 | B2 * | 7/2014 | Hodson | G06F 9/465 |
| | | | | 719/319 |

(Continued)

OTHER PUBLICATIONS

Bergou et al, "TRACKS: Toward Directable Thin Shells", ACM Transactions on Graphics, vol. 26, No. 3, Article 50, pp. 1-10, 2007. ( Year: 2007).*

(Continued)

*Primary Examiner* — Anil Khatri
(74) *Attorney, Agent, or Firm* — Talem IP Law, LLP

(57) ABSTRACT

A shell application feature can include trigger information and logic. During operation, the shell application feature can receive an indicator that a trigger occurred; and, in response to the trigger, initiate its logic. The logic of the shell feature is locally performed to identify whether state, object type, user actions, or a combination thereof, with respect to the application satisfy a success criteria corresponding to behavior that will be a prerequisite for a potential feature that is not yet fully implemented. If the state, object type, user action, or combination thereof satisfies the success criteria, a success notification can be communicated to a feature collection service.

20 Claims, 6 Drawing Sheets

(56) References Cited

U.S. PATENT DOCUMENTS

| | | | | |
|---|---|---|---|---|
| 8,863,083 | B2* | 10/2014 | McKellar | G06F 9/452 717/121 |
| 8,898,635 | B2* | 11/2014 | Mehalingam | G06F 8/433 705/29 |
| 9,026,998 | B2* | 5/2015 | Mizrahi | G06F 11/368 717/124 |
| 9,451,043 | B2* | 9/2016 | Zhao | H04L 67/08 |
| 9,830,307 | B1* | 11/2017 | Willhoit | G06F 17/30905 |
| 2015/0199378 | A1* | 7/2015 | Reyntjens | G06N 5/00 707/754 |
| 2016/0224461 | A1 | 8/2016 | Araya | |

OTHER PUBLICATIONS

Modugno et al, "Graphical Representation of Programs in a Demonstrational Visual Shell—An Empirical Evaluation", ACM Transactions on Computer-Human Interaction, vol. 4, No. 3, pp. 276-308, 1997 (Year: 1997).*

Kannan et al, "A Distributed AI Programming Shell", IEEE, pp. 34-42, 1990 (Year: 1990).*

Yang et al, "Distributed Programming in More Effcient Remote Shell Environment with Direct Data Forwarding and Lazy Connection Release", IEEE, pp. 720-726, 1995 (Year: 1995).*

Shen et al, "RACEZ: A Lightweight and Non-Invasive Race Detection Tool for Production Applications", ACM, pp. 401-410, 2011 ( Year: 2011).*

Garlach, "Improving Efficiency when Deriving Numerous Products from Software Product Lines Simultaneously", ACM, pp. 1-4, 2011 (Year: 2011).*

"International Search Report and Written Opinion Issued in PCT Application No. PCT/US2018/065574", dated Apr. 9, 2019, 11 Pages.

* cited by examiner

FEATURE USAGE PREDICTION USING SHELL APPLICATION FEATURE TELEMETRY

BACKGROUND

Software development can take considerable time and resources. The planning and roll-out of new features for existing and new applications often require assumptions on target market, potential impact, and viability of the feature, the discoverability of the feature, and the expected resource usage of the feature (e.g., capacity and bandwidth needs for the feature and/or its service).

Currently, when new features are being developed, existing data is used to determine answers to the questions such as who the targeted users are, what versions of the software they are running, how often they have active sessions, and what are the best designs for discoverability. Based on one or more of these assumptions, new features are specified and entirely developed before trying to instrument particular aspects of a new feature.

BRIEF SUMMARY

Feature usage prediction using shell application feature telemetry is provided. The described systems and techniques enable developers to understand how a feature—or its discoverability—will actually behave in a product through preemptive data collection based on expected user scenarios and behaviors—before ever having to fully build out the software feature. Indeed, the data collection and logic can occur without users having any interruptions to their work flow.

For feature development of a potential feature, one or more triggers are identified, and a shell feature logic are developed for deployment in an active user application running on a computing device as a shell application feature telemetry. These triggers and shell feature logic can be part of an update package of the active user application or otherwise incorporated into the active user application. In some cases, the shell application feature telemetry can be deployed to selected users or groups of users.

During operation of the active user application, the shell application feature triggers activate the shell feature logic in response to receiving an indicator that a trigger occurred. The shell feature logic is performed to determine whether user actions (in the form of, for example, application state and object type and action) satisfy success criteria corresponding to behavior that will be a prerequisite for the potential feature. If the user actions satisfy the success criteria, a success notification can be communicated to a feature collection service.

The data collected at the feature collection service can indicate whether and how the targeted users engage in the expected behavior and what the expected capacity needs may be. It is also possible to test trigger hypotheses for surfacing a variety of intelligent services.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
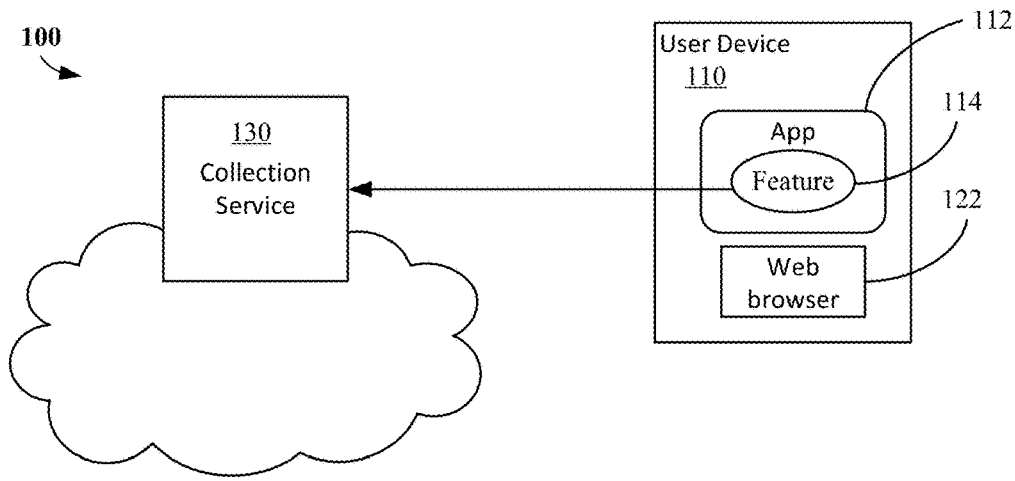
FIG. 1 illustrates an operating environment in which feature usage prediction using shell application feature telemetry may be carried out.

Feature usage prediction using shell application feature telemetry is provided.

As with any new feature, there will be new telemetry and logging to check for bugs, capacity, and viability, and there will be certain assumptions that will need to be measured. The described techniques enable new features to not be built, but rather particular aspects can be administered to measure whether (and, in some cases, how) the new feature will satisfy the desired metrics (on which the assumptions were made). The resulting measurements can be used to improve new features (as well as identify potential areas for new features) without requiring the full build of the feature.

A shell feature refers to a potential feature that is not yet fully implemented and is completely opaque to the user. A shell application feature telemetry refers to the data collection system that involves identified triggers and logic to capture whether a user's behavior satisfies success criteria for aspects of the shell feature, including discoverability design, resource bandwidth, and functionality.

For feature development of a potential feature, one or more triggers are identified, and shell feature logic is developed for deployment in an active user application running on a computing device as a shell application feature telemetry. These triggers and shell feature logic can be part of a first release of a user application, as part of an update package of the active user application, or otherwise incorporated into the active user application. In some cases, the shell application feature telemetry can be deployed to selected users or groups of users.

During operation of the active user application, the shell application feature triggers activate the shell feature logic in response to receiving an indicator that a trigger occurred. The shell feature logic is performed to determine whether user actions (in the form of, for example, application state and object type and action) satisfy success criteria corresponding to behavior that will be a prerequisite for the potential feature. If the user actions satisfy the success criteria, a success notification can be communicated to a feature collection service. Advantageously, privacy can be maintained as the user's information does not have to be transmitted to the collection service. Rather, activities are tracked locally for the user and only the success signal need be transmitted. The success signal can include an indication of which feature (behavior) had the success. In some cases, certain metadata can be transmitted to the feature collection service. This metadata would be aggregated and anonymized data. Indeed, any data collection would be expected to be carried out under appropriate privacy policies. The purpose of the information that would be sent to the feature collection service is not to collect content from a user device; rather, anonymized metadata concerning application state, object types and actions would be relevant to the feature collection service.

The data collected at the feature collection service can indicate whether and how the targeted users engage in the expected behavior and what the expected capacity needs may be. It is also possible to test trigger hypotheses and thresholds for surfacing a variety of intelligent services. Examples of intelligent services include, but are not limited to MICROSOFT PowerPoint Designer, Writing Assistant Editor, Smart Lookup, Researcher, Tap, Translator, as well as other services that are designed to connect—and even predict—impending transactions resulting from a change and automatically adjust them for the user. If collected, the information regarding how the targeted users engage in the expected behavior would be aggregated and anonymized to maintain privacy for the users.

Figure 2:
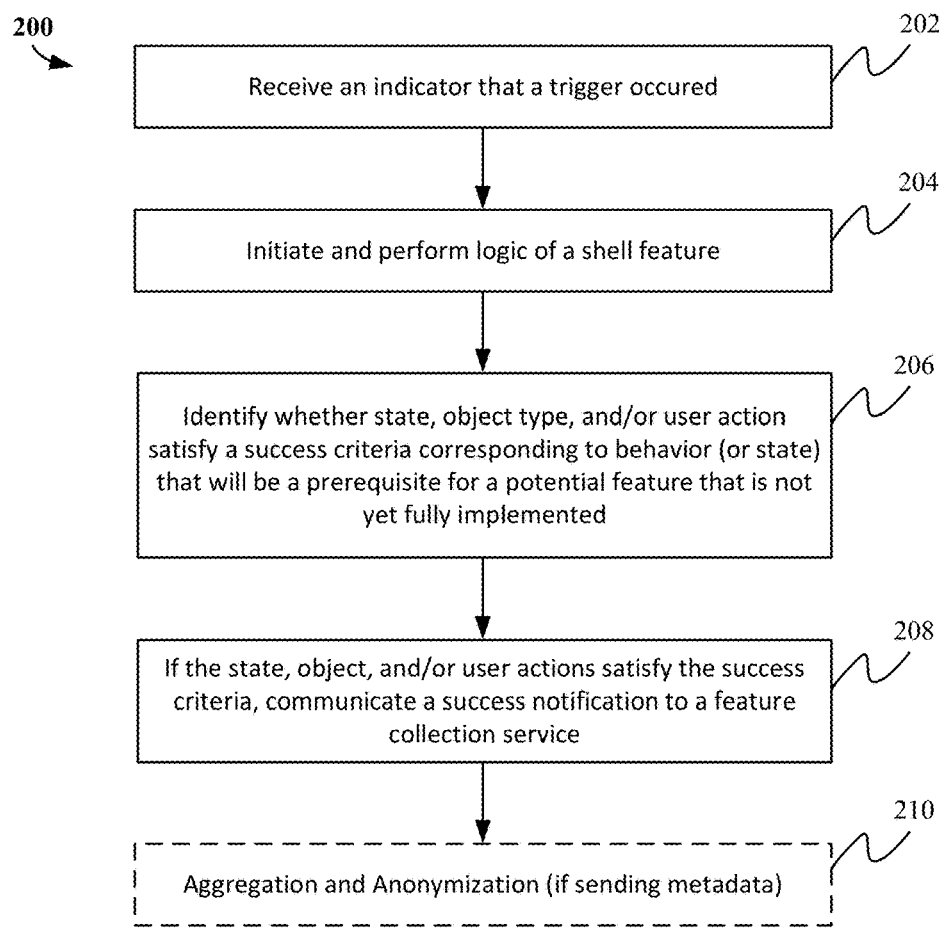
FIG. 2 illustrates an example process flow for shell application feature telemetry.

FIG. 1 illustrates an operating environment in which feature usage prediction using shell application feature telemetry may be carried out; and FIG. 2 illustrates an example process flow for shell application feature telemetry. Referring to the operating environment 100 shown in FIG. 1, a user device 110, which may be embodied as described with respect to system 700 of FIG. 7, can include applications such as application 112. Application 112 can be any software application and, in some cases, may even be an operating system. In some cases, the application 112 can be a productivity application (e.g., word processing application, presentation application, spreadsheet application, note application, and the like), a social media application (e.g., FACEBOOK, TWITTER, etc.), a communication application (e.g., instant message, MICROSOFT TEAMS, email), or even a bot/service. A shell application feature 114 can be part of the application 112 or at least able to receive state information about the application 112 and/or a user's behavior within the application 112 (e.g., commands or objects selected). The shell application feature 114 may be provided to the user device 110 during an update to the application 112 or as part of a newly acquired application. In some cases, the application from which the shell application feature 114 is tracking events within can be a web browser 122 or a browser-based application. In some cases where a browser-based application is the application incorporating the shell application feature, aspects of the shell application feature may be executed remotely from the user device 110 (but any non-anonymized data would be stored associated with the user's local account).

Application 112 may be considered a full or "native" version that is locally installed and executed. In some cases, application 112 may operate in a hybrid manner whereby a portion of the application is locally installed and executed, and other portions are executed remotely and then streamed to application platform 110 for local rendering.

Browser-based application 122, implemented on application platform 110, may be considered a browser-based version that is executed wholly or partly in the context of a browser application 122. In this model, all or part of the programming instructions are executed remotely, and the browser 122 renders the result to the user's device through a visual expression language such as HTML.

Also included in the operating environment 100 is a feature collection service 130 that collects the messages sent by the shell application feature 114 to support the feature usage prediction. In some cases, feature collection service 130 may be associated or part of a software service for the application 112. Feature collection service 130 can receive messages from multiple devices and applications and may aggregate the information for analysis. Unlike a conventional telemetry service that tracks errors, the feature collection service 130 receives success notification information from the shell application feature telemetry indicating that the criteria set forth in the shell application feature 114 has been satisfied. It should be noted that the criteria may include certain failure conditions (e.g., where a failure condition satisfies the criteria and thus a notification that the criteria has been satisfied can occur).

Shell application feature 114 can carry out process 200 such as shown in FIG. 2. For example, the shell application feature 114 can receive (202) an indicator that a trigger occurred. In response to receiving the trigger, the shell application feature 114 can initiate and perform the logic of the shell feature (204). The shell feature can be dormant until the trigger occurs. The shell feature can initiate by starting to record (e.g., locally store) the metadata about the actions of the user (e.g., the metadata on the objects that are being interacted with by the user). Through performing the logic, the shell application feature 114 can identify (206) whether user the application state, object type, and/or user actions satisfy a success criteria corresponding to behavior (user action or application state) that will be a prerequisite for a potential feature that is not yet fully implemented. If the state, object type, and/or user actions satisfy the success criteria (208), the shell application feature 114 can communicate a success notification to the feature collection service 130. The success criteria generally represent the expected criteria for the potential feature to execute. Metadata can also be communicated to the feature collection service 130 after local metadata processing (210) for example by aggregating and anonymizing the metadata that was recorded at the user device 110. The activities of the shell feature can be carried out offline.

Without the shell feature, the entire feature would have had to be developed; and then through beta testers or the public release, any complaints and metrics would be identified. Through use of the shell feature, it is possible to track whether a feature would not work, how often the situation would occur where the feature would be used, and other presumptions. By learning how often the proposed feature would execute and whether the target audience would likely have an opportunity for using the feature without actually developing the full feature, it is possible to determine a projected load before allocating time and money to developing a feature that would not be used.

Although, in some cases, user activities may be collected by the software service for the application 112 (e.g., for a variety of user-approved purposes), because the shell feature logic is executed at the user device (or as part of the user's account), additional information can be used by the shell feature logic about the context of the user's activities (and not just raw data logs). Of course, any information transmitted from the user device 110 would be first locally aggregated and anonymized.

Figure 3:
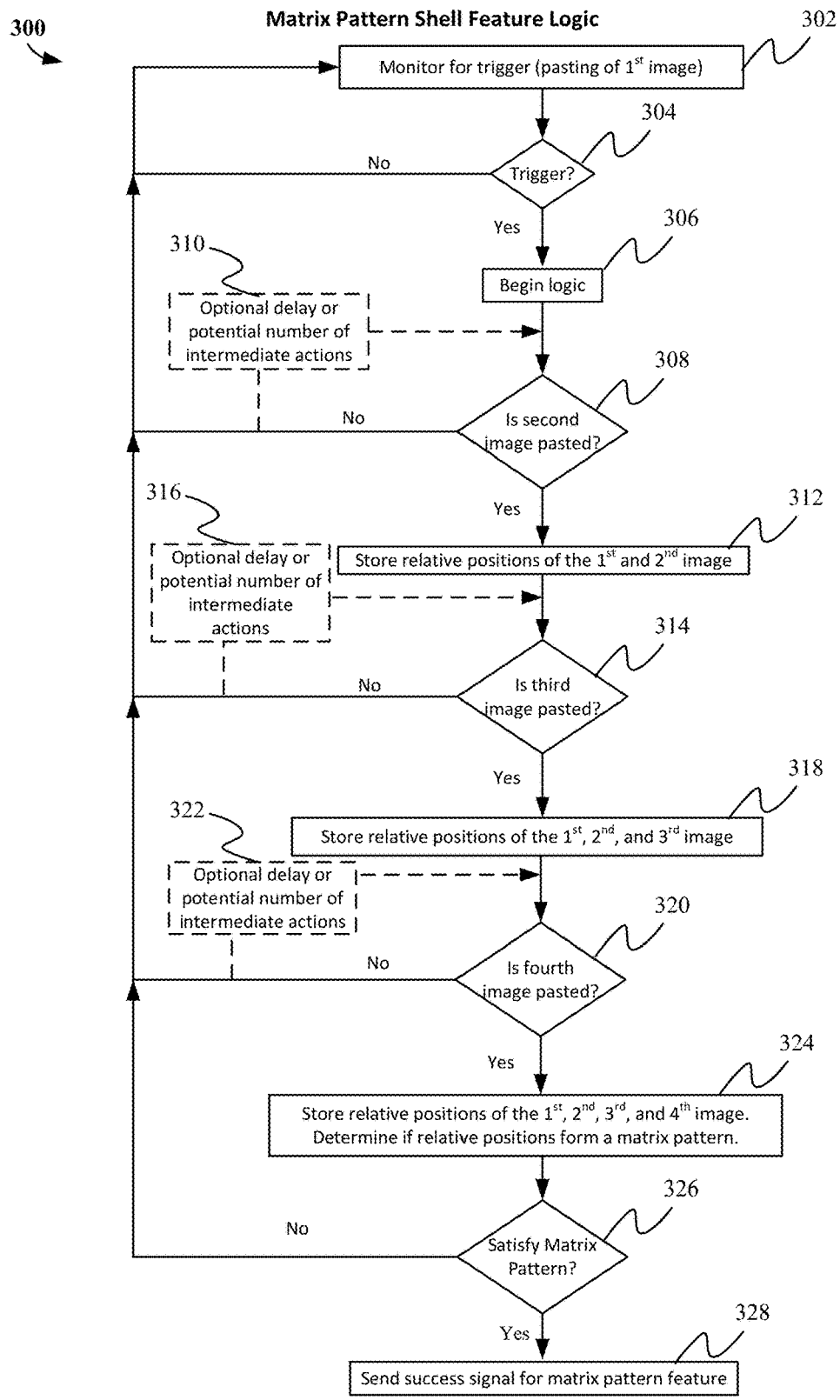
FIG. 3 illustrates an example shell feature logic for a matrix pattern feature.
Figure 4A:
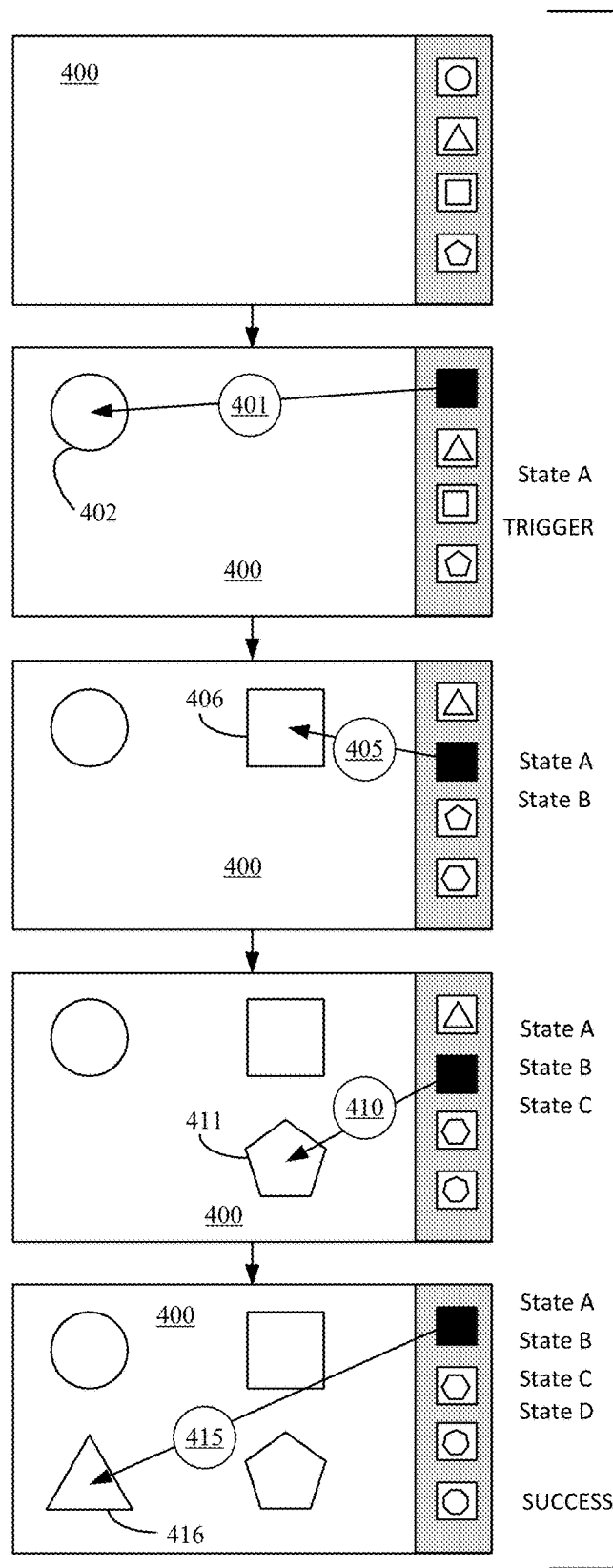
FIGS. 4A and 4B illustrate example scenarios of a user interacting with an application in which the example matrix pattern shell feature logic may be implemented.
Figure 4B:
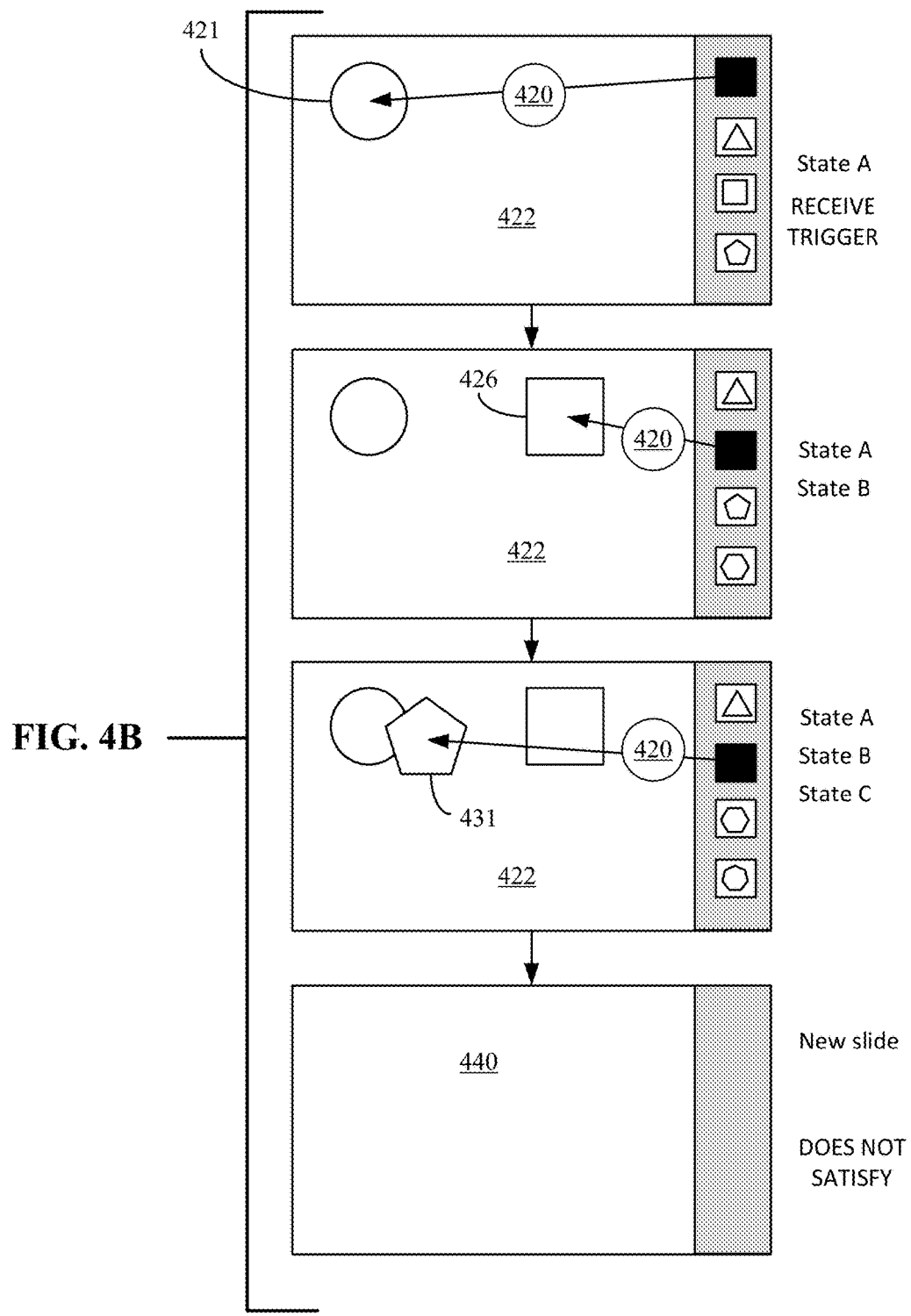

FIG. 3 illustrates an example shell feature logic for a matrix pattern feature; and FIGS. 4A and 4B illustrate example scenarios of a user interacting with an application in which the example matrix pattern shell feature logic may be implemented. In this example, the potential feature is a matrix pattern feature that would pop up a window to let a user know that a matrix pattern can be generated. The shell feature logic may be to determine whether four pictures are often inserted into a canvas (so that a matrix pattern may be desirable).

Referring to FIG. 3, an example process 300 includes monitoring (302) for a trigger action, which in this case detecting (304) a pasting of a first image into a canvas. If there is no trigger, the system can continue to monitor (302) for the action. However, once the trigger occurs, the feature logic can initiate (306) the recording of the actions/events (and context including metadata). The feature logic includes determining (308) whether a second image is pasted into the canvas. There may be an optional (310) delay or allowance of a certain number or types of intermediate actions between the first action and the second action; however, if no second image is pasted into the canvas, the actions do not satisfy the success criteria and the shell feature waits to be triggered again. If the second image is pasted into the canvas, the recording of the actions/events (and context) can continue. For example, the trigger feature may store (312) the relative positions of the two images (in case this is a characteristic for the feature).

The feature logic continues by determining (314) whether a third image is pasted into the canvas. There may be an optional (316) delay or allowance of a certain number or types of intermediate actions between the second action and the third action. In some cases, there may be certain actions that may not have to occur, and those actions can be included in the feature logic. Returning to the process illustrated in FIG. 3, if no third image is pasted into the canvas, the actions do not satisfy the success criteria and the shell feature waits to be triggered again. If the third image is pasted into the canvas, the recording of the actions/events (and context) can continue. For example, the trigger feature may store (318) the relative positions of each of the three images.

The feature logic continues by determining (320) whether a fourth image is pasted into the canvas. There may be an optional (322) delay or allowance of a certain number or types of intermediate actions between the third action and the fourth action; however, if no fourth image is pasted into the canvas, the actions do not satisfy the success criteria and the shell feature waits to be triggered again. If the fourth image is pasted into the canvas, the trigger feature may store (324) the relative positions of each of the four images and determine (326) whether the images satisfy the matrix pattern. If the images satisfy the matrix pattern, the shell application feature telemetry can send (328) a success signal to, for example, a collection service. The information about position of an image can be the type of metadata that may be anonymized and transmitted to the feature collection service with the success signal. The position information could later be used to, for example, show that many users like a certain distance between images and be used to improve a potential feature.

Referring to FIG. 4A, a user may be creating a slide for a presentation and is creating content in the canvas 400. In this example, the trigger is an action with respect to a particular object type; however, the trigger may include logic. In addition, the trigger may be a state of the application or be a combination of application state, object type, and action. As shown in FIG. 4A, the feature logic may be triggered by the first pasting (401) of an image 402 into the canvas 400. The feature logic records the activities within the application, including receiving a second pasting (405) of a second image 406 into the canvas 400, a third pasting (410) of a third image 411 into the canvas 400, and a fourth pasting (415) of a fourth image 416 into the canvas 400. Based on these activities, the feature logic can determine that the user's actions satisfy the success criteria.

Referring to FIG. 4B, as with the case of FIG. 4A, the feature logic may be triggered by the first pasting (420) of an image 421 into a canvas 422. In this example, the trigger is an action with respect to a particular object type; however, the trigger may include logic. In addition, the trigger may be a state of the application or be a combination of application state, object type, and action. The feature logic records the activities within the application, including receiving a second pasting (425) of a second image 426 into the canvas 422, and a third pasting (430) of a third image 431 into the canvas 422. Since no fourth pasting occurs, and instead a new slide 440 is inserted, the actions of the user do not satisfy the criteria. In some cases, the event of inserting the new slide can be recorded in addition to the prior activities (and optional associated metadata). In some cases, the shell application feature telemetry can also communicate a notification of a near success (e.g., where the success criteria are not met, but fail at a certain point). In such cases, metadata (anonymized) can be communicated to facilitate learning from scenarios that were almost completed to show how often the success criteria was almost met and what action, object type, or application state created the failure of satisfying the feature logic.

It should be understood that although the illustrative feature logic example in FIGS. 3 and 4A-4B shows a linear logic flow, more complex logic may be provided for the feature logic. For example, feature logic can include continue thresholds, forks, timestamps, and other programming.

Figure 5A:
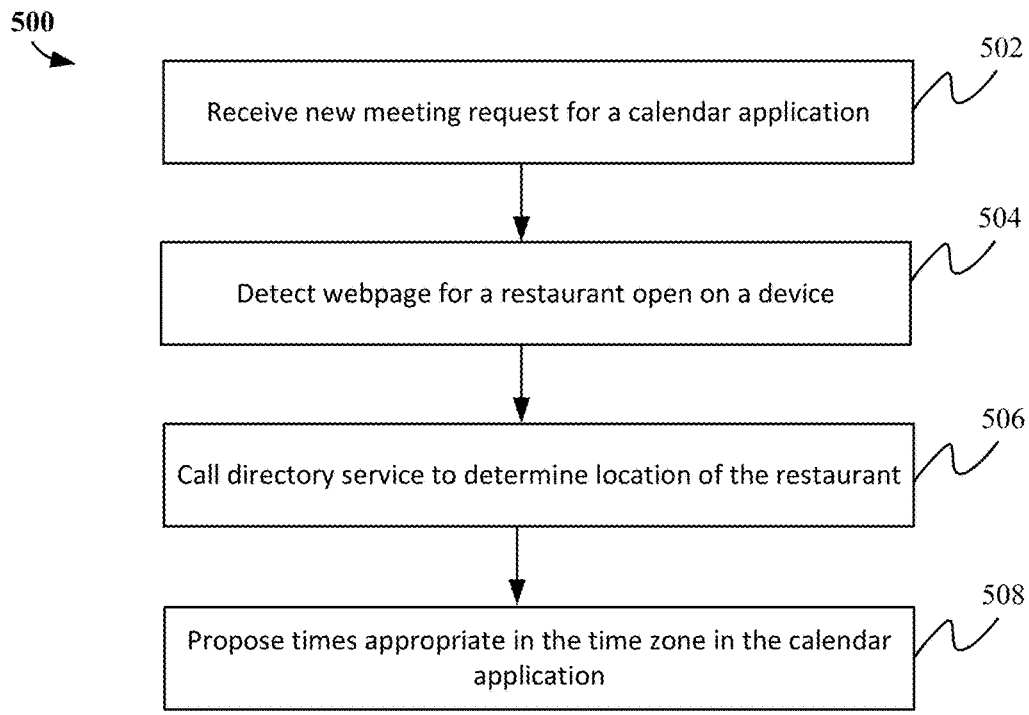
FIGS. 5A and 5B illustrate another example scenario in which a shell application feature telemetry may operate.
Figure 5B:
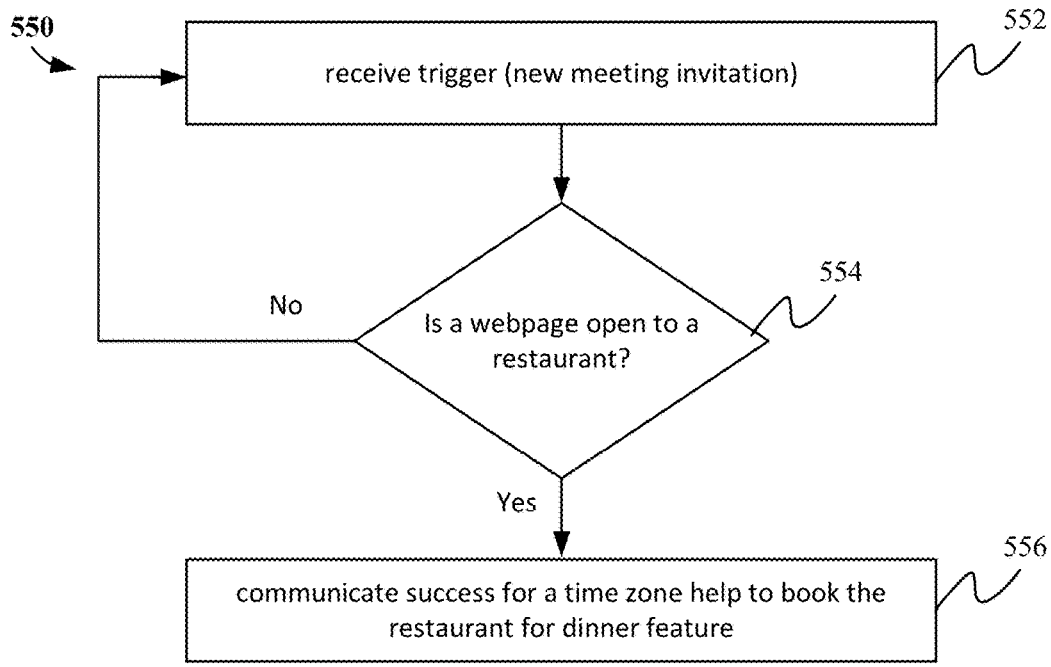

FIGS. 5A and 5B illustrate another example scenario in which a shell application feature telemetry may operate. Referring to FIG. 5A, a software company may want to develop a feature that helps users with scheduling events in different time zones. A proposed application feature would perform process 500, for example, as part of a calendar application, as a standalone application, a widget, a bot, or other application. The proposed feature would, when a new meeting request is received (502) for a calendar application, detect (504) whether a web page for a restaurant was also open on the user device. If there was a web page for a restaurant open, the proposed feature would call (506) a directory service to determine a location of the restaurant and propose (508) times appropriate in the time zone in the calendar application.

Instead of developing this proposed feature, shell application feature telemetry may be carried out to identify whether the use case for this feature actually occurred at a frequency that makes sense for the software company to address, as well as to identify how often the service call would occur to determine the effect of its use on the computing and network resources (without actually having the call made). For example, as shown in FIG. 5B, the shell feature logic could be set up to perform process 550 with the trigger of a new meeting invitation. Thus, the shell feature receives (552) an indicator that the trigger occurred, which initiates the logic of the shelf feature. Here, the logic determines (554) whether there is a webpage open to a restaurant while the new meeting invitation is open. If the webpage is open, the shell feature can confirm that the success criteria were met and communicate (556) the success signal to the collection service. The communicating (556) can occur asynchronously, for example, in a batch transmission of information to the collection service after aggregating and anonymizing the information.

Advantageously, while the user goes about their actions, the user is not interrupted by the shell feature. In addition, even though the proposed feature would have a web service call (e.g., operation 506), this action is not carried out by the user's system.

Other examples of feature usage prediction using shell application feature telemetry include the following.

For a spreadsheet application feature such as a rich entity conversion feature, triggers of an offline list of countries, cities, and states could be downloaded to a user's machine. The shell feature logic then checks the user's cell contents in a spreadsheet and detects how many times a user enters consecutive cells containing names of a product. From this shell application feature telemetry, it is possible to learn the number of consecutive cells containing names of a product entered into spreadsheets. The aggregated and anonymized data sent to the feature collection service can indicate the number of cells containing a product name, but does not actually include the product names themselves. This helps predict, in relative terms, how often users work with information involving product names, and helps predict how much server load should be anticipated for the rich entity conversion feature.

For a word processing application feature for research, triggers can be defined for when a user inserts an equation into a word processing document. The shell feature logic can detect the number of times this occurs (e.g., how often an equation is inserted) and which equations or math operators are used in a classroom setting. This information can be used to identify optimized equation tools to support class projects.

Advantageously, through the described techniques, a new timeline for feature development can take place with the following order for a project: a new feature idea, investigate available data, instrument telemetry, build in logic, collect data, and evaluate trigger/feature viability. Existing data can be used to determine who targeted users are, what versions of software the users are running. Then the shell application feature telemetry can be used to test out whether users would engage in the expected behavior that the feature will address. The real telemetry data can be used to predict capacity needs, rather than a ballpark estimation. The shell application feature telemetry can be used to test the multiple trigger hypotheses before spending time building the software features.

Figure 6:
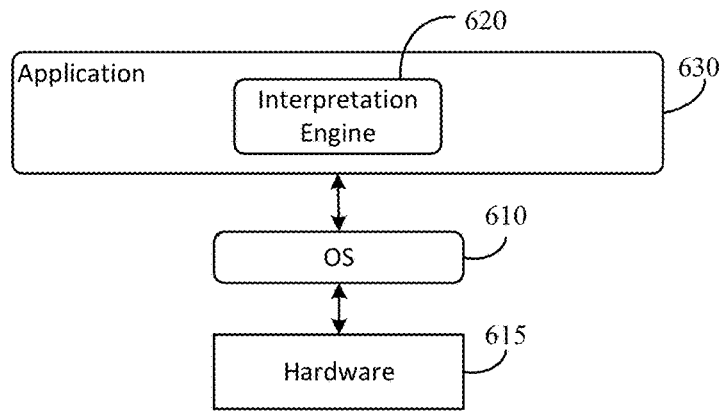
FIG. 6 illustrates an architecture for a user computer device.
Figure 7:
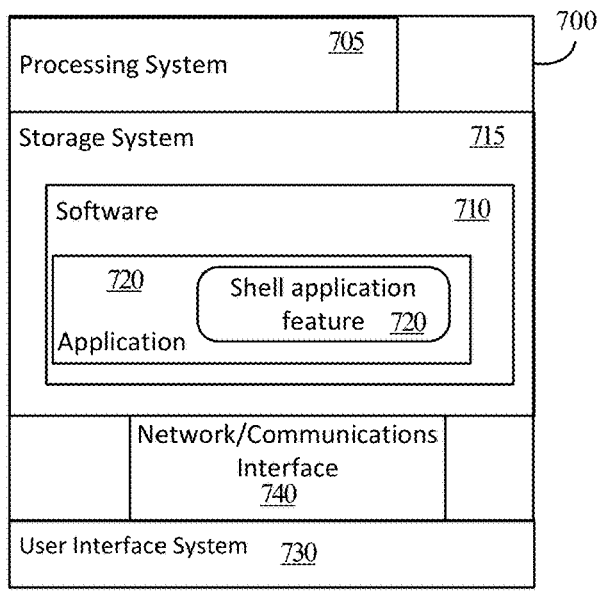
FIG. 7 illustrates components of a computing device that may be used in certain embodiments described herein.

An illustrative architecture for a user computing device is provided with reference to FIGS. 6 and 7.

Referring to FIG. 6, the architecture for the user computing device can include a device operating system (OS) 610. The device OS 610 manages user input functions, output functions, storage access functions, network communication functions, and other functions for the device. The device OS 610 may be directly associated with the physical resources of the device or running as part of a virtual machine backed by underlying physical resources. According to many implementations, the device OS 610 includes functionality for recognizing user gestures and other user input via the underlying hardware 615.

An interpretation engine 620 of an application 630 running on the device OS 610 listens (e.g., via interrupt, polling, and the like) for user input event messages from the device OS 610. The UI event messages can indicate a panning gesture, flicking gesture, dragging gesture, or other gesture on a touchscreen of the device, a tap on the touch screen, digital ink input, keystroke input, or other user input (e.g., voice commands, directional buttons, trackball input). The interpretation engine 620 translates the UI event messages into messages understandable by the application. This information can be used by the shell feature when performing the shell feature logic.

FIG. 7 illustrates components of a computing device that may be used in certain embodiments described herein.

Referring to FIG. 7, system 700 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen. Accordingly, more or fewer elements described with respect to system 700 may be incorporated to implement a particular computing device.

System 700 includes a processing system 705 of one or more processors to transform or manipulate data according to the instructions of software 710 stored on a storage system 715. Examples of processors of the processing system 705 include general purpose central processing units (CPUs), graphics processing units (GPUs), field programmable gate arrays (FPGAs), application specific processors, and logic devices, as well as any other type of processing device, combinations, or variations thereof. The processing system 705 may be, or is included in, a system-on-chip (SoC) along with one or more other components such as network connectivity components, sensors, video display components.

Software 710 may be implemented in program instructions and among other functions may, when executed by system 700 in general or processing system 705 in particular, direct system 700 or the one or more processors of processing system 705 to operate as described herein with respect to the active application(s), shell feature logic, and local metadata processing.

The software 710 can include an operating system and application programs, including one or more shell application features 720 (and local metadata processing along with aggregation and anonymization) directing processes as described herein. Device operating systems generally control and coordinate the functions of the various components in the computing device, providing an easier way for applications to connect with lower level interfaces like the networking interface. Non-limiting examples of operating systems include WINDOWS from Microsoft Corp., APPLE iOS from Apple, Inc., ANDROID OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 7, can be thought of as additional, nested groupings within the operating system space, each containing an OS, application programs, and APIs.

Storage system 715 may comprise any computer readable storage media readable by the processing system 705 and capable of storing software 710 including applications and one or more shell application features 720.

Storage system 715 may include volatile and nonvolatile memories, removable and non-removable media implemented in any method or technology for storage of information, such as computer readable instructions, data structures, program modules, or other data. Examples of storage media of storage system 715 include random access memory, read only memory, magnetic disks, optical disks, CDs, DVDs, flash memory, magnetic cassettes, magnetic tape, magnetic disk storage or other magnetic storage devices, or any other suitable storage media.

Storage system 715 may be implemented as a single storage device but may also be implemented across multiple storage devices or sub-systems co-located or distributed relative to each other. Storage system 715 may include additional elements, such as a controller, capable of communicating with processing system 705.

The system can further include user interface system 730, which may include input/output (I/O) devices and components that enable communication between a user and the system 700. User interface system 730 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 730 may also include output devices such as display screen(s), speakers, haptic devices for tactile feedback, and other types of output devices. In certain cases, the input and output devices may be combined in a single device, such as a touchscreen display which both depicts images and receives touch gesture input from the user.

A natural user interface (NUI) may be included as part of the user interface system 730. Examples of NUI methods include those relying on speech recognition, touch and stylus recognition, gesture recognition both on screen and adjacent to the screen, air gestures, head and eye tracking, voice and speech, vision, touch, hover, gestures, and machine intelligence. Accordingly, the systems described herein may include touch sensitive displays, voice and speech recognition, intention and goal understanding, motion gesture detection using depth cameras (such as stereoscopic or time-of-flight camera systems, infrared camera systems, red-green-blue (RGB) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Visual output may be depicted on a display (not shown) in myriad ways, presenting graphical user interface elements, text, images, video, notifications, virtual buttons, virtual keyboards, or any other type of information capable of being depicted in visual form. It should be understood that, in most cases, no outward graphical user interface elements or other information would be displayed when the shell application feature is running.

The user interface system 730 may also include user interface software and associated software (e.g., for graphics chips and input devices) executed by the OS in support of the various user input and output devices. The associated software assists the OS in communicating user interface hardware events to application programs using defined mechanisms. The user interface system 730 including user interface software may support a graphical user interface, a natural user interface, or any other type of user interface.

Network interface 740 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Figure 8:
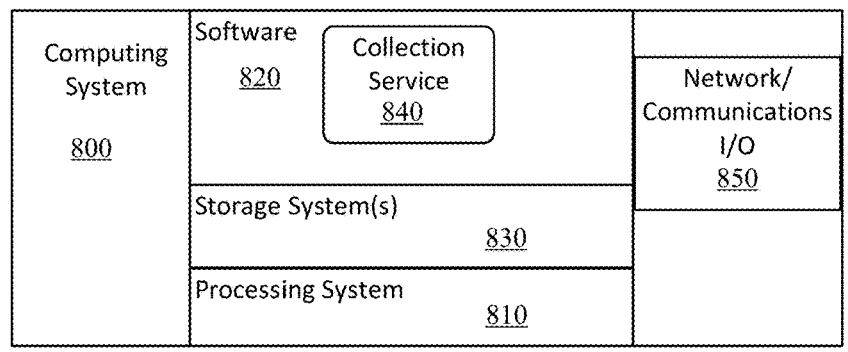
FIG. 8 illustrates components of a computing system that may be used in certain embodiments described herein.

FIG. 8 illustrates components of a computing system that may be used in certain embodiments described herein. Referring to FIG. 8, system 800 may be implemented within a single computing device or distributed across multiple computing devices or sub-systems that cooperate in executing program instructions. The system 800 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 800 can include a processing system 810, which may include one or more processors and/or other circuitry that retrieves and executes software 820 from storage system 830. Processing system 810 may be implemented within a single processing device but may also be distributed across multiple processing devices or sub-systems that cooperate in executing program instructions.

Storage system(s) 830 can include any computer readable storage media readable by processing system 810 and capable of storing software 820. Storage system 830 may be implemented as a single storage device but may also be implemented across multiple storage devices or sub-systems co-located or distributed relative to each other. Storage system 830 may include additional elements, such as a controller, capable of communicating with processing system 810. Storage system 830 may also include storage devices and/or sub-systems on which anonymized data is stored.

Software 820, including collection service 840, may be implemented in program instructions and among other functions may, when executed by system 800 in general or processing system 810 in particular, direct the system 800 or processing system 810 to operate as described herein for the collection service 130.

In embodiments where the system 800 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 850 may be included, providing communication connections and devices that allow for communication between system 800 and other computing systems (not shown) over a communication network or collection of networks (not shown) or the air.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory, propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
one or more processors;
a storage system;
an application stored on the storage system;
a shell application feature comprising trigger information to define a trigger and logic of a shell feature stored on the storage system that, when executed by at least one of the one or more processors, directs the at least one of the one or more processors to:
receive an indicator that the trigger occurred;
in response to the trigger, initiate the logic of the shell feature, wherein the shell feature is a potential feature that is not yet fully implemented for the application;
determine, according to the logic of the shell feature, whether one or more of state, object type, and user actions with respect to the application satisfy a success criteria corresponding to behavior that will be a prerequisite for the potential feature that is not yet fully implemented; and
if the one or more of state, object type, and user action satisfies the success criteria, communicate a success notification to a feature collection service.

2. The system of claim 1, wherein the application comprises a productivity application.

3. The system of claim 1, wherein the application comprises a social media application.

4. The system of claim 1, wherein the application comprises a communication application.

5. The system of claim 1, wherein the application comprises an operating system.

6. The system of claim 1, further comprising a second shell application feature stored on the storage system that, when executed by at least one of the one or more processors, directs the at least one of the one or more processors to:

receive a corresponding indicator that a corresponding trigger occurred;
in response to the corresponding trigger, initiate logic of a second shell feature, wherein the second shell feature is a second potential feature that is not yet fully implemented for the application;
determine, according to the logic of the second shell feature, whether one or more of state, object type, and user actions with respect to the application satisfy a second success criteria corresponding to behavior that will be a prerequisite for the potential second feature that is not yet fully implemented; and
if the one or more of state, object type, and user action satisfies the second success criteria, communicate a corresponding success notification to the feature collection service.

7. The system of claim 1, the potential feature comprises a service call, wherein in the logic of the shell feature, the service call is not performed.

8. The system of claim 1, wherein the shell application feature further directs the processing system to:
store metadata on the storage system when performing the logic of the shell feature;
perform local metadata processing of the metadata; and
if the one or more of state, object type, and user action satisfies the success criteria, communicate processed metadata to the feature collection service.

9. One or more computer readable storage media having instructions including a shell application feature comprising trigger information to define a trigger and logic of a shell feature stored thereon that when executed by a computing device, direct the computing device to at least:
receive an indicator that the trigger occurred;
in response to the trigger, initiate the logic of the shell feature, wherein the shell feature is a potential feature that is not yet fully implemented for the application;
determine, according to the logic of the shell feature, whether one or more of state, object type, and user actions with respect to the application satisfy a success criteria corresponding to behavior that will be a prerequisite for the potential feature that is not yet fully implemented; and
if the one or more of state, object type, and user action satisfies the success criteria, communicate a success notification to a feature collection service.

10. The media of claim 9, wherein the instructions that direct the computing device to perform the logic of the shell feature direct the computing device to:
locally store metadata about actions of the user; and
identify from the metadata whether the one or more of state, object type, and user actions satisfy the success criteria.

11. The media of claim 9, the potential feature comprises a service call.

12. The media of claim 11, wherein in the logic of the shell feature, the service call is not performed.

13. A method comprising:
receiving, at a system comprising a shell application feature, an indicator that a trigger occurred, wherein the shell application feature comprises trigger information to define the trigger and logic of a shell feature, wherein the shell feature is a potential feature that is not yet fully implemented for the application;
in response to the trigger, initiating the logic of the shell feature;
determining, according to the logic of the shell feature, whether one or more of state, object type, and user actions with respect to one or more applications satisfy a success criteria corresponding to behavior that will be a prerequisite for the potential feature that is not yet fully implemented; and if the one or more of state, object type, and user action satisfies the success criteria, communicating a success notification to a feature collection service.

14. The method of claim 13, further comprising:

receiving an update to at least one of the one or more applications, wherein the update comprises the shell application feature comprising the trigger information to define the trigger and the logic of the shell feature.

15. The method of claim 13, wherein at least one of the one or more applications comprises a productivity application.

16. The method of claim 13, wherein at least one of the one or more applications comprises a social media application.

17. The method of claim 13, wherein at least one of the one or more applications comprises a communication application.

18. The method of claim 13, wherein at least one of the one or more applications comprises an operating system.

19. The method of claim 13, wherein the potential feature comprises a service call.

20. The method of claim 13, further comprising:

locally storing metadata on the storage system when performing the logic of the shell feature;

performing local metadata processing of the metadata; and if the one or more of state, object type, and user action satisfies the success criteria, communicate processed metadata to the feature collection service.

* * * * *